United States Patent
Do et al.

(10) Patent No.: US 7,482,071 B2
(45) Date of Patent: Jan. 27, 2009

(54) PERPENDICULAR MAGNETIC RECORDING DISK WITH IMPROVED RECORDING LAYER HAVING HIGH OXYGEN CONTENT

(75) Inventors: Hoa Van Do, Fremont, CA (US); Bernd Heinz, San Jose, CA (US); Yoshihiro Ikeda, San Jose, CA (US); Kentaro Takano, San Jose, CA (US); Min Xiao, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 696 days.

(21) Appl. No.: 11/135,750

(22) Filed: May 24, 2005

(65) Prior Publication Data
US 2006/0269799 A1 Nov. 30, 2006

(51) Int. Cl.
*G11B 5/66* (2006.01)
(52) U.S. Cl. .................. 428/836.2; 204/192.2
(58) Field of Classification Search ........... None
See application file for complete search history.

(56) References Cited

U.S. PATENT DOCUMENTS

| | | | |
|---|---|---|---|
| 5,062,938 A | 11/1991 | Howard | |
| 5,066,552 A | 11/1991 | Howard et al. | |
| 5,478,661 A | 12/1995 | Murayama et al. | |
| 5,679,473 A | 10/1997 | Murayama et al. | |
| 5,919,581 A | 7/1999 | Yamamoto et al. | |
| 6,177,208 B1 | 1/2001 | Yamamoto et al. | |
| 6,686,070 B1 | 2/2004 | Futamoto et al. | |
| 6,696,172 B2 | 2/2004 | Oikawa et al. | |
| 6,777,077 B2 | 8/2004 | Lee et al. | |
| 6,835,475 B2 | 12/2004 | Carey et al. | |
| 7,183,011 B2 * | 2/2007 | Nakamura et al. | ....... 428/831.2 |
| 2003/0152809 A1 | 8/2003 | Oikawa et al. | |

(Continued)

FOREIGN PATENT DOCUMENTS

| | | |
|---|---|---|
| JP | 2003313659 | 11/2003 |
| WO | WO2004/064048 | 7/2004 |
| WO | 2004090874 A1 | 10/2004 |
| WO | WO2005/031713 | 4/2005 |

OTHER PUBLICATIONS

Inaba, "Optimization of the SiO2 Content in CoPtCr-SiO2 Perpendicular Recording Media for High-Density Recording", IEEE Trans Magn, vol. 40, No. 4, Jul. 2004, pp. 2486-2488.
Uwazumi, et al., "CoPtCr-SiO2 Granular Media for High-Density Perpendicular Recording", IEEE Trans Magn, vol. 39, No. 4, Jul. 2003, pp. 1914-1918.
Zheng et al., "Role of Oxygen Incorporation in Co-Cr-Pt-Si-O Perpendicular Magnetic Recording Media", IEEE Trans Magn, vol. 40, No. 4, Jul. 2004, pp. 2498 2500.

(Continued)

*Primary Examiner*—Holly Rickman
(74) *Attorney, Agent, or Firm*—Thomas R. Berthold

(57) ABSTRACT

A perpendicular magnetic recording disk has an improved recording layer of a granular CoPtCr-based ferromagnetic alloy with inter-granular material made up of one or more oxides of Cr and one or more oxides of one or more of a segregant of Si, Ta, Ti, B, Nb or Hf, wherein the amount of oxygen present in the recording layer is greater than about 22 atomic percent and less than about 35 atomic percent. The amount of oxygen in the recording layer is substantially greater than the amount required for the stoichiometric oxide or oxides of the segregant or segregants, and a substantial portion of the oxygen present in the recording layer is present in the inter-granular material. The recording layer exhibits high signal-to-noise ratio (SNR), a coercivity $H_c$ greater than about 5000 Oe and a nucleation field $H_n$ greater (more negative) than about −1500 Oe.

5 Claims, 4 Drawing Sheets

U.S. PATENT DOCUMENTS

| | | |
|---|---|---|
| 2003/0157375 A1 | 8/2003 | Uwazumi et al. |
| 2003/0215675 A1 | 11/2003 | Inaba et al. |
| 2004/0027868 A1 | 2/2004 | Nakamura et al. |
| 2004/0185308 A1 | 9/2004 | Kida et al. |
| 2005/0058855 A1* | 3/2005 | Girt ................. 428/694 TS |
| 2007/0042227 A1* | 2/2007 | Iwasaki et al. ............ 428/832 |
| 2007/0217067 A1* | 9/2007 | Nakamura et al. .......... 360/126 |

OTHER PUBLICATIONS

Chiba et al., "Structure and magnetic properties of Co-Pt-Ta2O5 film for perpendicular magnetic recording media", J. of Mag and Magn Mater, vol. 287, Feb. 2005, pp. 161-171.

EPO Search Report App#EP06251353.

* cited by examiner

PERPENDICULAR MAGNETIC RECORDING DISK WITH IMPROVED RECORDING LAYER HAVING HIGH OXYGEN CONTENT

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The most common type of perpendicular magnetic recording system is one that uses a recording head with a single write pole and a "dual-layer" media, as shown in FIG. 1. The dual-layer media includes a perpendicular magnetic data recording layer (RL) formed on a "soft" or relatively low-coercivity magnetically permeable underlayer (SUL). The SUL serves as a flux return path for the field from the write pole to the return pole of the recording head. This type of system is also called "Type 1" perpendicular magnetic recording. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk. The disk includes a hard disk substrate, an adhesion or onset layer (OL) for growth of the SUL, the SUL, an underlayer (UL) on the SUL to facilitate growth of the RL, and a protective overcoat (OC). One type of conventional material for the RL is a granular ferromagnetic cobalt alloy, such as a CoPtCr alloy. The ferromagnetic grains of this material have a hexagonal-close-packed (hcp) crystalline structure and out-of-plane or perpendicular magnetic anisotropy as a result of the c-axis of the hcp crystalline structure being induced to grow perpendicular to the plane of the layer during deposition. To induce this epitaxial growth of the hcp RL, the UL onto which the RL is formed is also typically an hcp material. Ruthenium (Ru) is one type of material proposed for the UL. While a single-layer UL is depicted in FIG. 2, the UL may be a multilayer structure, with one or more hcp layers and a seed layer between the SUL and the hcp layer or layers. The UL also typically functions as an exchange break layer to break the magnetic exchange coupling between the RL and the magnetically permeable SUL.

A perpendicular magnetic recording medium has also been proposed wherein the RL is the upper ferromagnetic layer of an antiferromagnetically-coupled (AFC) layer, as depicted in FIG. 3. The AFC layer comprises a lower ferromagnetic layer on the UL, an antiferromagnetically (AF) coupling layer on the lower ferromagnetic layer, and an upper ferromagnetic layer (the RL) on the AF-coupling layer. In this type of medium, as described in U.S. Pat. No. 6,815,082 B2, each ferromagnetic layer is a granular cobalt alloy with perpendicular magnetic anisotropy. The AF-coupling layer induces perpendicular antiferromagnetic exchange coupling between the two ferromagnetic layers, as depicted in FIG. 3 by the antiparallel magnetization directions between the two ferromagnetic layers in each magnetized region of the AFC layer.

To achieve high performance perpendicular magnetic recording disks at ultra-high recording densities, e.g., greater than 200 Gbits/in$^2$, the RL should exhibit low intrinsic media noise (high signal-to-noise ratio or SNR), a coercivity $H_c$ greater than about 5000 Oe and a nucleation field $H_n$ greater (more negative) than about −1500 Oe. The nucleation field $H_n$ is the reversing field, preferably in the second quadrant of the M-H hysteresis loop, at which the magnetization begins to drop from its saturation value ($M_s$). The more negative the nucleation field, the more stable the remanent magnetic state will be because a larger reversing field is required to alter the magnetization.

It is well-known that the granular cobalt alloy RL should have a well-isolated fine-grain structure to produce a high-$H_c$ media and to reduce inter-granular exchange coupling, which is responsible for high intrinsic media noise. Enhancement of grain segregation in the RL has been proposed by the addition of metal oxides which precipitate to the grain boundaries. The addition of $SiO_2$ to a CoPtCr granular alloy by sputter deposition from a CoPtCr—$SiO_2$ composite target is described by H. Uwazumi, et al., "CoPtCr—$SiO_2$ Granular Media for High-Density Perpendicular Recording", *IEEE Transactions on Magnetics*, Vol. 39, No. 4, July 2003, pp. 1914-1918. The RL described in this reference had $H_c$ of about 4000 Oe and $H_n$ of about −700 Oe. The addition of $Ta_2O_5$ to a CoPt granular alloy is described by T. Chiba et al., "Structure and magnetic properties of Co—Pt—$Ta_2O_5$ film for perpendicular magnetic recording media", *Journal of Magnetism and Magnetic Materials*, Vol. 287, February 2005, pp. 167-171. The RL described in this reference had $H_c$ of about 3000 Oe when the RL was sputter deposited from a composite target of CoPt and $Ta_2O_5$, and no increase in $H_c$ was obtained by introducing oxygen gas during sputtering.

In the above-cited references the amount of oxygen added is not significantly greater than that required for the stoichiometric metal oxide. The effect of the addition of an even greater amount of oxygen to a CoPtCr granular alloy by reactive sputter deposition of a CoPtCr—$SiO_2$ composite target in an argon/oxygen (Ar/$O_2$) gas mixture is described by M. Zheng et al., "Role of Oxygen Incorporation in Co—Cr—Pt—Si—O Perpendicular Magnetic Recording Media", *IEEE Transactions on Magnetics*, Vol. 40, No. 4, July 2004, pp. 2498-2500. This reference teaches that the maximum $H_c$ of about 4000 Oe is achieved at the optimal amount of oxygen in the RL of 15 atomic percent (at. %). Only a minor portion of the Cr is in the oxide form and there is no strong evidence of $SiO_2$ in the RL. If the amount of oxygen is increased above the optimum, the excess oxygen forms oxides of Cr and Co in the grains, resulting in a reduction in $H_c$. At a level of 21 at. % oxygen, $H_c$ is reduced to about 1000 Oe, which renders the RL unusable.

What is needed is a perpendicular magnetic recording disk with a CoPtCr granular alloy RL that exhibits $H_n$ greater than about −1500 Oe and that has a well-isolated fine-grain structure resulting in high SNR and $H_c$ greater than about 5000 Oe.

SUMMARY OF THE INVENTION

The invention is a perpendicular magnetic recording disk with an improved recording layer, and a perpendicular magnetic recording system that includes the disk, the write head and the read head. The recording layer is a granular CoPtCr-based ferromagnetic alloy with inter-granular material made up of one or more oxides of Cr and one or more oxides of one or more of a segregant of Si, Ta, Ti, B, Nb or Hf, wherein the amount of oxygen present in the recording layer is greater than about 22 atomic percent and less than about 35 atomic percent. The amount of oxygen in the recording layer is substantially greater than the amount required for the stoichiometric oxide or oxides of the segregant or segregants, and a substantial portion of the oxygen present in the recording layer is present in the inter-granular material. Preferably only, a single segregant is added, so that in addition to the Cr oxide or oxides, the only oxide or oxides in the inter-granular material are those from just a single element selected from among Si, Ta, Ti, B, Nb and Hf. The recording layers exhibit high SNR, $H_c$ greater than about 5000 Oe and $H_n$ greater (more negative) than about −1500 Oe.

For a fuller understanding of the nature and advantages of the present invention, reference should be made to the following detailed description taken together with the accompanying figures.

DETAILED DESCRIPTION OF THE INVENTION

Figure 1:
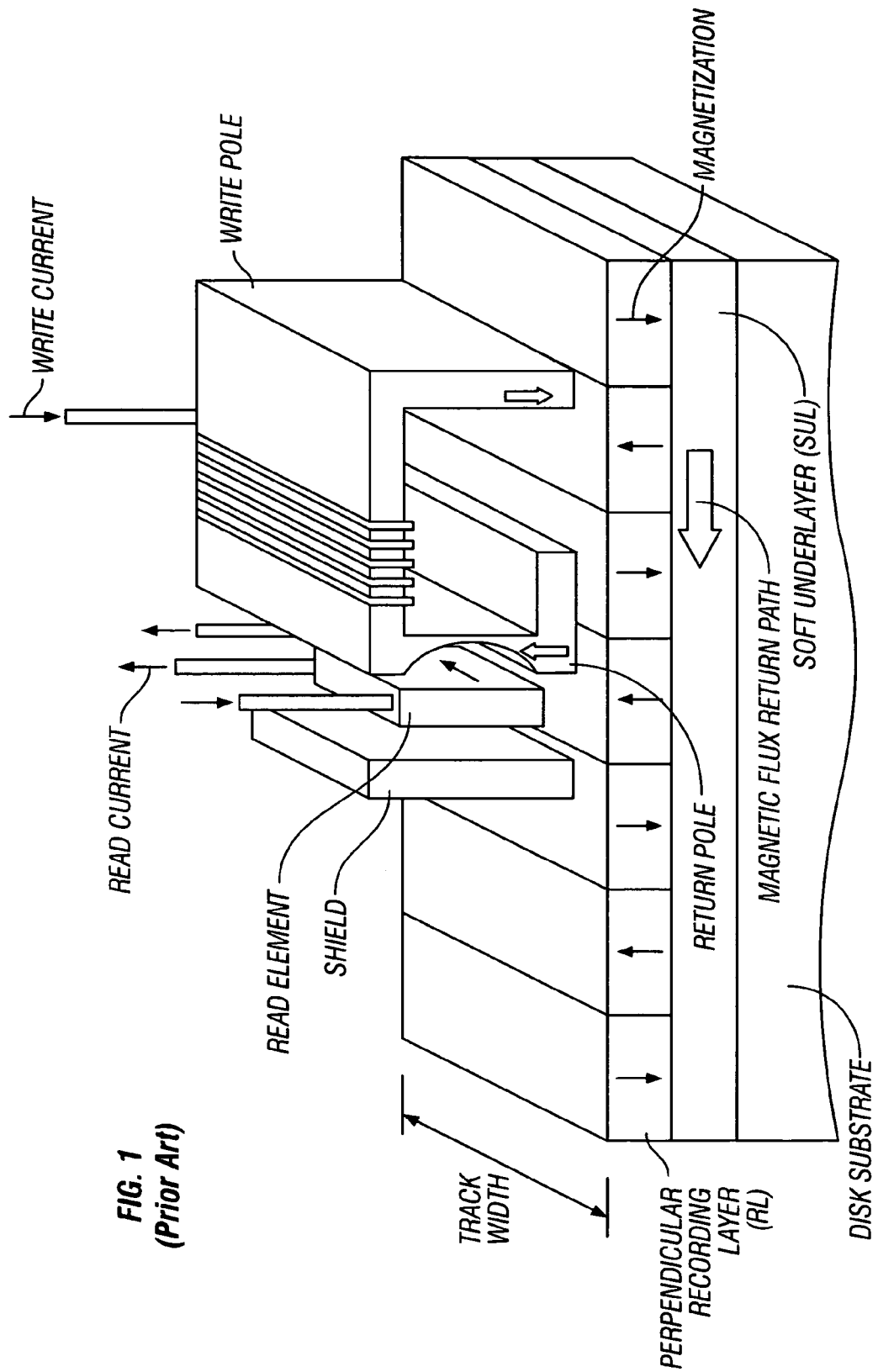
FIG. 1 is a schematic of a prior art perpendicular magnetic recording system.
Figure 2:
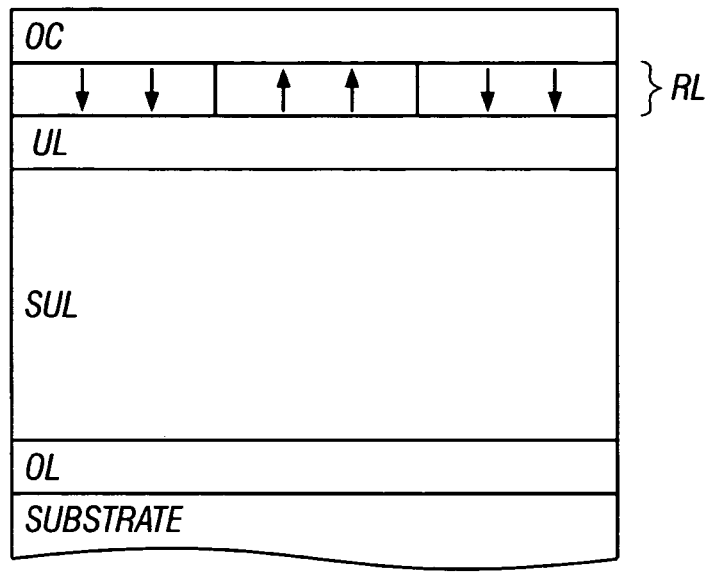
FIG. 2 is a schematic of a cross-section of a perpendicular magnetic recording disk according to the prior art.
Figure 4:
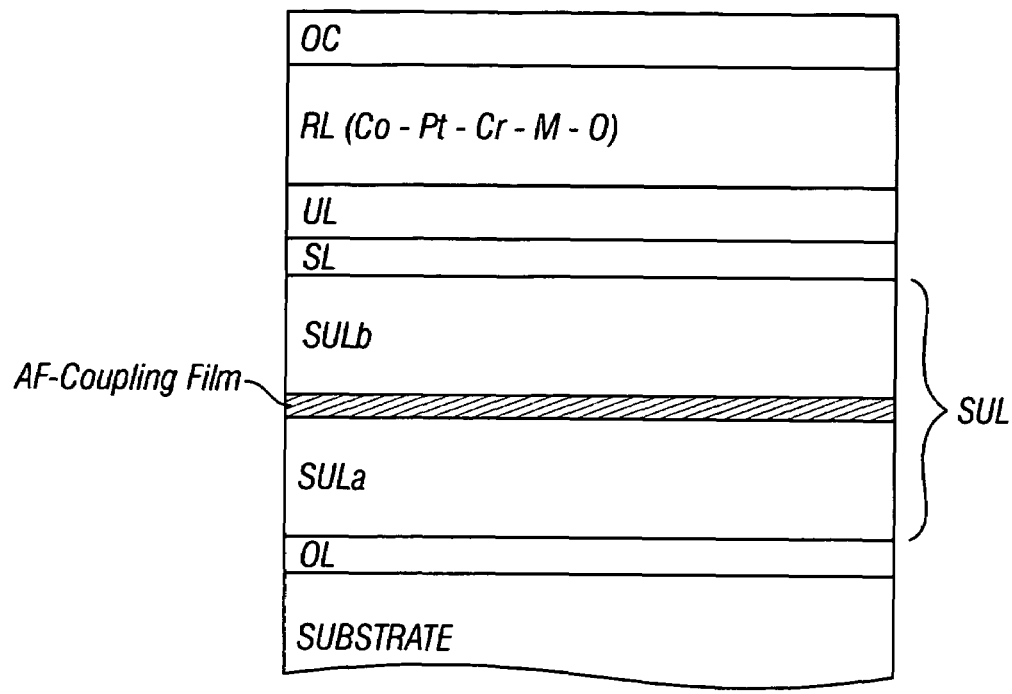
FIG. 4 is a schematic of a cross-section of a perpendicular magnetic recording disk according to the present invention.

The perpendicular magnetic recording disk according to the present invention is illustrated in FIG. 4. The structure is similar to the prior art structure of FIG. 2 except for the composition of the RL.

Referring to FIG. 4, the various layers making up the disk are located on the hard disk substrate. The substrate may be any commercially available glass substrate, but may also be a conventional aluminum alloy with a NiP or other known surface coating, or an alternative substrate, such as silicon, canasite or silicon-carbide. The SUL is located on the substrate, either directly on the substrate or directly on an adhesion layer or OL. The OL facilitates the growth of the SUL and may be an AlTi alloy or a similar material with a thickness of about 20 to 50 Angstroms. The SUL is a laminated or multilayered SUL formed of multiple soft magnetic layers (SULa and SULb) separated by an interlayer film (such as Ru, Ir, or Cr) that acts as an antiferromagnetic (AF) coupling film to mediate antiferromagnetic exchange coupling between SULa and SULb. This type of SUL is described in U.S. Pat. Nos. 6,686,070 B1 and 6,835,475 B2. The SUL may also be a single layer. The SUL may also be a laminated or multilayered SUL formed of multiple soft magnetic films separated by nonmagnetic films, such as electrically conductive films of Al or CoCr. The SUL layer or layers are formed of amorphous magnetically permeable materials such as alloys of CoNiFe, FeCoB, CoCuFe, NiFe, FeAlSi, FeTaN, FeN, FeTaC, CoTaZr, CoFeB, and CoZrNb. The thickness of the SUL is typically in the range of approximately 500 to 4000 Angstroms. The OC formed on the RL may be an amorphous "diamond-like" carbon film or other known protective overcoat, such as silicon nitride.

The nonmagnetic underlayer UL on the SUL is a nonmagnetic metal or alloy having a hexagonal close-packed (hcp) crystal structure for controlling the hcp crystal orientation in the granular RL. The UL promotes the epitaxial growth of the hcp granular RL so that its c-axis is oriented substantially perpendicular, thereby resulting in perpendicular magnetic anisotropy. Ruthenium (Ru) is a commonly used material for the UL, but other materials include a metal selected from Ti, Re, and Os, and an alloy containing at least one element selected from Ti, Re, Ru, and Os. The thickness of the UL is typically in the range of about 70 to 220 Angstrom. If Ru is used as the UL, it may be formed directly on a seed layer (SL) that is formed on the SUL, such as 10 to 20 Angstrom thick layer of NiFe.

The RL is a granular CoPtCr-based ferromagnetic alloy with inter-granular material made up of one or more oxides of Cr and one or more oxides of one or more of an "M" segregant (where M is Si, Ta, Ti, B or Nb), wherein the amount of oxygen present in the RL is greater than about 22 atomic percent and less than about 35 atomic percent. This amount of oxygen is substantially greater than the amount required for the stoichiometric M-oxide or oxides, and a substantial portion (more than 70%) of the oxygen present in the RL is in the inter-granular material. Preferably the M oxide or oxides in the inter-granular material is an oxide or oxides of just one element selected from among Si, Ta, Ti, B and Nb. The RL exhibits high SNR, $H_c$ greater than about 5000 Oe and $H_n$ greater (more negative) than about −1500 Oe.

Figure 5:
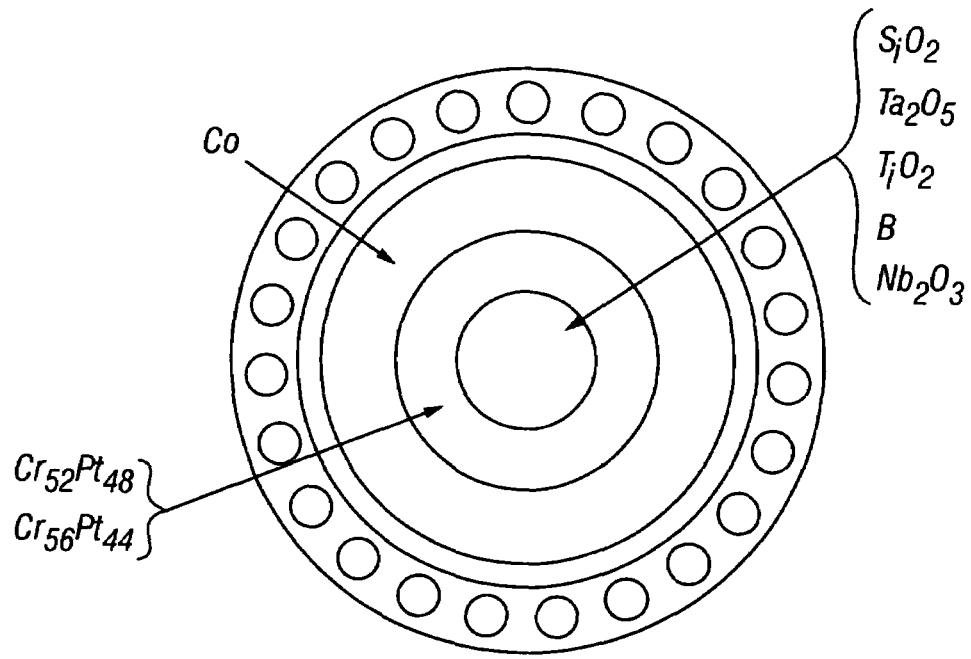
FIG. 5 is a view of the multi-target sputtering source and associated target compositions used to make the disks with recording layer compositions according to the present invention.

Recording layers (RLs) with various compositions were fabricated by reactive sputtering in an Ar/O2 gas mixture using a Unaxis® Triatron multi-target sputtering source. The sputtering source is shown in FIG. 5 and has three concentric targets, each with its own power supply. To make the various compositions the inner target was either the M-O stoichiometric material ($SiO_2$, $Ta_2O_5$, $TiO_2$, $Nb_2O_3$) or just M (B). The middle target was a CrPt alloy (either $Cr_{52}Pt_{48}$ or $Cr_{56}Pt_{44}$, where the subscripts represent at. %) and the outer target was Co.

Figure 6:
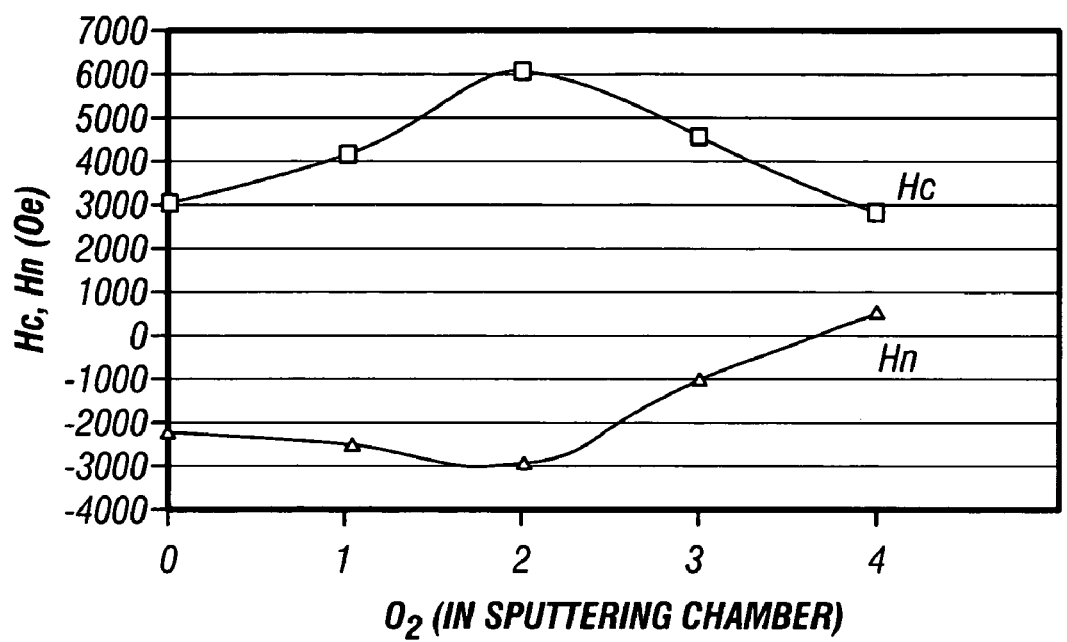
FIG. 6 is a graph of coercivity $H_c$ and nucleation field $H_n$ as a function of $O_2$ partial pressure in the sputtering chamber for a disk with a recording layer composition according to the present invention.

While oxygen is present in the M-O target, substantially more oxygen is required to produce a RL with high-performance magnetic properties. This is accomplished by controlling the partial pressure of $O_2$ in the Ar/$O_2$ gas mixture. FIG. 6 shows the measured $H_c$ and $H_n$ for five different RLs (with $Ta_2O_5$ as the M-O inner target) deposited at five different $O_2$ partial pressures. FIG. 6 is representative of similar curves produced for all of the experimental data with different M-O or M inner targets. The data point on each curve identifies the $O_2$ partial pressure that gives the RL with the best $H_c$ and $H_n$. The disks with these optimal RLs were then analyzed for oxygen content and composition using the standard methods of Rutherford Backscattering (RBS) and Particle-Induced X-ray Emission (PIXE). The data is summarized in Table 1 below.

TABLE 1

| RL | Co (at. %) | Pt (at. %) | Cr (at. %) | M (at. %) | O (at. %) | $H_c$ (Oe) | $H_n$ (Oe) | SNR(dB) @365 kfci |
|---|---|---|---|---|---|---|---|---|
| Co—Pt—Cr—Si—O | 49.2 | 11.4 | 10.7 | 3.9 | 24.8 | 6500 | −1500 | 17.8 |
| Co—Pt—Cr—Ta—O | 49.0 | 10.5 | 10.4 | 3.1 | 27.0 | 6500 | −2500 | 16.0 |
| Co—Pt—Cr—Ti—O | 46.3 | 10.6 | 10.2 | 6.6 | 26.3 | 6000 | −2000 | 15.2 |
| Co—Pt—Cr—B—O | 50.0 | 11.5 | 10.5 | 3.0 | 25.0 | 5500 | −1200 | 14.2 |
| Co—Pt—Cr—Nb—O | 50.5 | 10.5 | 11.0 | 3.0 | 25.0 | 6300 | −2000 | 18.6 |

In the above table the SNR was measured at a linear recording density of 365 thousand flux changes/inch (kfci).

The curves like FIG. 6 were also used to determine the range of oxygen content in the RL that will produce RLs with $H_c$ greater than about 5500 Oe and $H_n$ greater than about −2000 Oe. In all cases this range was determined to be between about 22 and 35 at. %. Because the amount of oxygen in the RL is substantially greater than that required to form the stoichiometric M-O, substantial amounts of Cr oxides are also formed between the grains. The RLs in Table 1 were also analyzed using the standard method of electron energy loss spectroscopy (EELS). The results demonstrated that essentially only Cr, M and O are present in the inter-granular material near the grain boundaries, and that more than 70% of the oxygen present in the RL exists in the inter-granular material. Because of the high amount of oxygen present, this data essentially confirms that a substantial portion of the Cr is present as oxides in the inter-granular material.

In addition to the RLs listed in Table 1, additional samples were made with different amounts of M segregants, by altering the power to the different targets in the multi-target sputtering source, to determine the ranges of M segregant composition that will provide RLs with the desired magnetic properties. The optimal segregant ranges were determined to be about 2-9 at. % for Si, 2-5 at. % for Ta, 4-10 at. % for Ti, 3-7 at. % for B, and 2-5 at. % for Nb.

The RLs listed in Table 1 have only a single M element present because the inner target of the multi-target sputtering source contained only a single M-O or M element. However, it is well known that other composite sputtering targets can be fabricated with one or more elements of Si, Ta, Ti, B and Nb so that the RL can include more than one of the M segregants, in which case the inter-granular material would include one or more oxides of all of the segregants in addition to one or more oxides of Cr.

A RL was also fabricated with hafnium (Hf) as the M-segregant using the same reactive sputtering method as described above. While specific data like in Table 1 was not available for this RL with Hf, reasonably good recording performance has been obtained for a Co—Pt—Cr—Hf—O RL.

Figure 3:
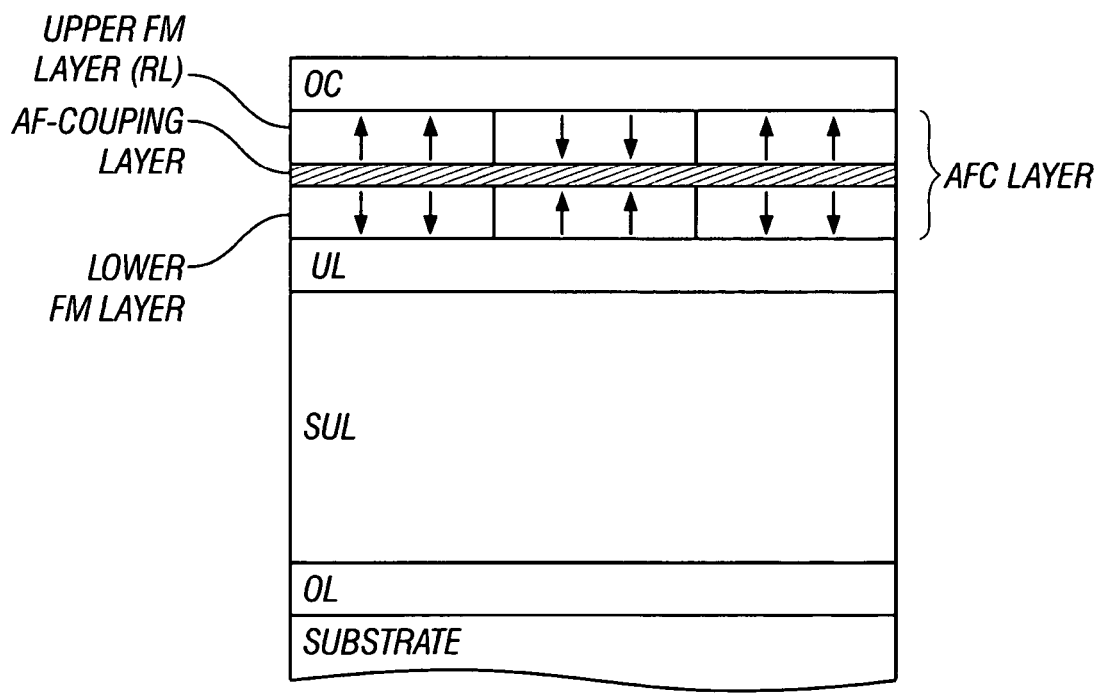
FIG. 3 is a schematic of a cross-section of a perpendicular magnetic recording disk having an antiferromagnetically-coupled (AFC) layer according to the prior art.

While the above data was demonstrated for single-layer RLs, as shown in FIG. 4, the RLs with compositions according to the present invention may also used be as the upper ferromagnetic layer in a perpendicular magnetic recording disk with an antiferromagnetically-coupled (AFC) layer, as depicted in FIG. 3.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
a substrate;
a layer of magnetically permeable material on the substrate;
a nonmagnetic underlayer on the layer of magnetically permeable material and having a hexagonal-close-packed (hcp) crystalline structure; and
a granular magnetic recording layer on the underlayer and having a hcp crystalline structure with the c-axis oriented substantially perpendicular to the recording layer, the recording layer comprising Co, Pt, Cr, and oxides consisting of oxides of Cr and Ta, said Cr oxides and Ta oxides being present primarily between the grains of the granular magnetic recording layer, wherein the amount of oxygen present in the recording layer is greater than about 22 atomic percent and less than about 35 atomic percent and the amount of Ta present in the recording layer is greater than about 2 atomic percent and less than about 5 atomic percent, the recording layer having a coercivity $H_c$ greater than about 6000 Oe and a nucleation field $H_n$ more negative than about −2000 Oe.

2. The disk of claim 1 wherein more than about 70 percent of the oxygen present in the recording layer is present between the grains.

3. A perpendicular magnetic recording system comprising:
the disk of claim 1;
a write head for magnetizing regions in the recording layer of said disk; and
a read head for detecting the transitions between said magnetized regions.

4. A method for reactively sputter depositing a granular magnetic recording layer of a perpendicular magnetic recording disk, the disk comprising a substrate; a layer of magnetically permeable material on the substrate; a nonmagnetic underlayer on the layer of magnetically permeable material and having a hexagonal-close-packed (hcp) crystalline structure; and a granular magnetic recording layer on the underlayer and having a hcp crystalline structure with the c-axis oriented substantially perpendicular to the recording layer, the recording layer comprising Co, Pt, Cr, and oxides consisting of oxides of Cr and Ta, said Cr oxides and said Ta oxides being present primarily between the grains of the granular magnetic recording layer, wherein the amount of oxygen present in the recording layer is greater than about 22 atomic percent and less than about 35 atomic percent and the amount of Ta present in the recording layer is greater than about 2 atomic percent and less than about 5 atomic percent, the recording layer having a coercivity $H_c$ greater than about 6000 Oe and a nucleation field $H_n$ more negative than about −2000 Oe, the method comprising:

providing a sputtering chamber;

providing in the chamber an oxide sputtering target consisting essentially of only $Ta_2O_5$;

providing in the chamber one or more sputtering targets consisting essentially of only Co, Pt and Cr;

applying power to all of said sputtering targets; and introducing an argon/oxygen gas mixture into said chamber while controlling the partial pressure of oxygen in said chamber within a predetermined range to thereby reactively sputter deposit said recording layer having said values of coercivity and nucleation field.

5. The method of claim 4 wherein controlling the partial pressure of oxygen in said chamber within a predetermined range comprises controlling the partial pressure of oxygen in said chamber to be between about 1.5 and 2.5 percent.

* * * * *